Patented Feb. 4, 1947

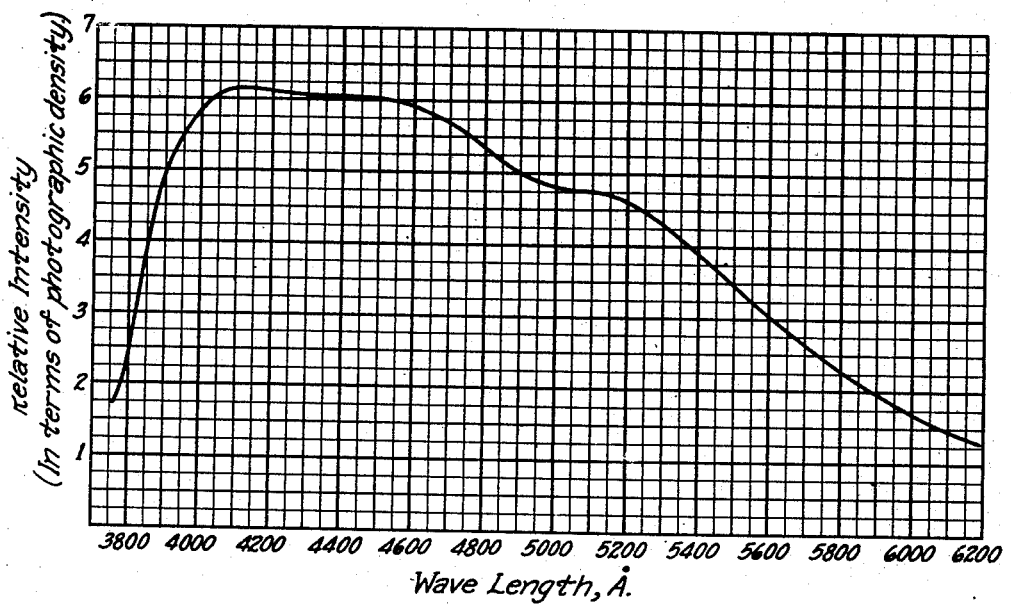

2,415,129

UNITED STATES PATENT OFFICE 2,415,129

LUMINESCENT MATERIAL

Herman C. Froelich, Cleveland, Ohio, assignor to General Electric Company, a corporation of New York Application August 23, 1943, Serial No. 499,642

5 Claims. (Cl. 252—301.4)

This invention relates to a combination of luminescent material or phosphor with a source of exciting radiation, and particularly to a new phosphor. Phosphors consist in general of a major proportion of a so-called base material or matrix and a minor proportion of another material called an activator. Several activators may coact in the fluorescence of a phosphor, and may co-operate to produce effects which could not be expected from the emissions which they would produce singly in a given matrix material. The radiation of a phosphor when excited depends on the relations between matrix and activator materials, as largely determined by heat-treatment which they undergo together, as well as on the materials themselves and their relative proportions. Apparently it is the metal of an activator material that determines its effect in a phosphor, although this metal is usually present as a compound.

I have found that calcium silicate as matrix can be activated with titanium to give a high output of ultraviolet radiation when excited with cathode rays, as well as visible light of a light-blue color quality, although it is not appreciably or substantially excited by ultraviolet radiation, whether short-wave such as 2537 Å., or long-wave such as 3650 Å. The phosphor shows an integrated intensity of radiation that brings it into comparison with silver-activated zinc sulphide for producing ultraviolet under cathode ray excitation. In general, normal calcium metasilicate, $CaSiO_3$, gives a somewhat brighter response to cathode ray excitation than does calcium orthosilicate, $Ca_2SiO_4$. When the titanium activator in calcium silicate phosphor is suitably supplemented with manganese as a co-operating activator, as described hereinafter, the phosphor gives white or pinkish white visible light, along with some ultraviolet. For this purpose, the normal metasilicate shows a pronounced superiority to orthosilicate in brightness of the phosphor.

I have further found that the silicates of all the ordinary solid metals of group II of the periodic system—which of course excludes the liquid metal mercury, and the ultra-rare and extraordinary metal radium, both of very high atomic weight, exceeding 200—can be activated with titanium, and afford phosphors whose properties are generally similar to those of titanium-activated calcium silicate as described above, though their relative strength in ultraviolet and visible light and the color-quality of the latter vary somewhat, as well as their total integrated radiation. Silicates of the alkaline earth metals calcium, strontium, and barium give blue light of successively deeper shades from light-blue to decidedly deep-blue; while silicates of the magnesium-group metals beryllium, magnesium, zinc, and cadmium give light ranging from approximately zero for beryllium through light-blue for magnesium and for zinc to reddish for cadmium. As regards ultraviolet, the order of intensities is approximately the reverse of the order of color depth, with calcium, magnesium, and zinc standing at the top of the list, in order of diminishing intensity. These alkaline earth and magnesium group metals may conveniently be distinguished from the other group II metals, mercury and radium, as the group II metals of atomic weight below 200.

Various other features and advantages of my invention will appear from the description of species and forms of embodiment, in which normal calcium silicate $CaSiO_3$ is particularly referred to, and from the drawing. The single figure of the drawing shows a curve of relative intensity distribution for a specimen of this normal calcium silicate activated with titanium, the abscissae representing wave-lengths and the ordinates representing the corresponding intensities of radiation.

The mol ratio between calcium oxide (CaO) and silica ($SiO_2$) in the matrix of my calcium silicate phosphor is not very critical, though some excess of silica over the stoichiometric ratio for $CaSiO_3$ is desirable in compounding the phosphor, such as 1.1 mol. This is especially true when manganese is present as a supplemental activator, to assure against the formation of compounds that would detract from the desired white appearance of the product when looked at by daylight. In general, the batch materials for the phosphor should be of the high purity customarily used in the preparation of phosphors, and preferably of at least C. P. or reagent grade; and when silicic acid is used, a grade with a content of 85-95 per cent $SiO_2$ is very suitable. All the materials should preferably be of a fine particle size, such as some 1-5 microns. One way of producing the phosphor is to precipitate the silicate matrix from solution along with vehicle(s) of the activating metals, as by mixing a solution of soluble silicate (such as an alkali metal silicate like sodium silicate or potassium silicate) with a mixed solution of salts of the matrix and activator metals (such as calcium nitrate, titanium sulphate, and manganese nitrate), filter off and dry the resulting precipitate, and then heat or fire this precipitate as hereinafter described. Another simple and convenient way of making the phosphor is by direct thermal synthesis of ingredients comprising or yielding calcium oxide (CaO), silica (SiO$_2$), titanium dioxide (TiO$_2$), and (if desired) manganese oxide (MnO). Intimate and homogeneous interincorporation of the activating component(s) with the silicate matrix is most readily effected by forming the silicate in the presence of the activator vehicle(s); and for this purpose, a silicon compound such as silica or silicic acid may be brought into reaction with some compound that will yield calcium oxide (CaO)—any compounds which interact to form silicate of the metal being more or less suitable. A superior phosphor of greatly augmented brightness of fluorescence is obtained by using a calcium compound that yields calcium oxide (CaO) substantially or approximately at the temperature of calcium silicate formation, such as calcium carbonate (CaCO$_3$) or calcium sulphate (CaSO$_4$), rather than calcium oxide itself.

Favorable proportions of activating titanium are around ½ per cent to 1 percent of TiO$_2$ by weight in the phosphor. Amounts as small as 0.1 per cent or as large as 5 per cent give substantially reduced fluorescent brightness.

Using ingredients of the character just indicated, suitable proportions for a phosphor activated with titanium alone are as follows:

Calcium carbonate, CaCO$_3$__ 100 g., giving CaO, 1 mol=56 g.
Silicic acid, 85% SiO$_2$_____ 70.7 to 77.6 g. giving SiO$_2$, 1 to 1.1 mol=60 to 66 g.
Titanium dioxide, TiO$_2$_____ 0.6 to 1.2 g. giving in the finished phosphor, by weight, 0.5 to 1%.

While these ingredients might be simply ball-milled together and then fired or calcined, I generally prefer to mix and ball-mill together (dry) only the calcium carbonate and the silicic acid, which may be done in a 2 quart ball-mill in about 1 hour, afterward incorporating the titanium dioxide compound in the form of titanium sulphate, Ti(SO$_4$)$_2$, in the wet way. For this purpose, a solution of Ti(SO$_4$)$_2$ may be prepared by heating together, at a fuming temperature around 200° C.:

| | Grams |
|---|---|
| Sulphuric acid (H$_2$SO$_4$) | 10 |
| Ammonium sulphate (NH$_4$SO$_4$) | 5 |
| Titanium dioxide (TiO$_2$) | 1.2 | until the solids are dissolved and the liquid is clear; allowing the product to cool, and dissolving the resulting mass in 100 cc. of water; and then adding dilute aqueous ammonia until a trace of precipitate just persists. The ball-milled powder mixture of calcium carbonate and silicic acid is wet down with this solution to a slurry or paste, more water being added if necessary. The paste is dried and sieved, a screen of some 100 mesh being suitable.

The batch may be heated or calcined in a refractory crucible (as of silica or alundum) in a refractory electric muffle furnace, with free exposure to the air, at a temperature of the order of 1000° to 1200° C. Heating for about two hours gives satisfactory results, and 1130° C. is a good temperature. After being allowed to cool, the phosphor may be sieved through a screen of some 100 to 200 mesh, and is then ready for use. It may be applied to the lamp tube or envelope on which it is used with the aid of a carbonaceous binder in the usual way, though any ball-milling to incorporate the powder in the binder should preferably be brief.

I have found that the brightness of the phosphor can be enhanced materially either by variation of the procedure described above, or by variation of the batch composition. The variation of procedure here referred to consists in firing the batch in the electric muffle furnace in the presence of steam continuously passed through the furnace. The variation of the batch composition consists in replacing some of the calcium carbonate in the foregoing formula with an equivalent mol per cent of sulphate, such as sulphuric acid or calcium sulphate; so that with a 10 per cent replacement, the formula becomes, for example:

| | Grams |
|---|---|
| Calcium carbonate, CaCO$_3$ | 90 |
| Calcium sulphate, CaSO$_4$ | 13.6 |
| Silicic acid, 85% SiO$_2$ | 70.7 to 77.6 |
| Titanium dioxide, TiO$_2$ | 0.6 to 1.2 |

The compounding and preparation of this batch for firing may be the same as before.

I have also found that by combining this partial substitution of sulphate in the batch with firing the latter in steam in lieu of air, a more or less cumulative enhancement of the brightness of the phosphor can in some cases be produced; and, indeed, my brightest phosphor specimens have been produced in this way.

Suitable proportions of ingredients for a phosphor activated with both titanium and manganese (in proportions by weight of 0.5 per cent TiO$_2$ and 0.3 per cent MnO in the finished phosphor), and fluorescing pinkish white, are as follows:

Calcium carbonate, CaCO$_3$____ 100 g. giving CaO, 1 mol=56 g.
Silicic acid, 85% SiO$_2$_____ 77.6 g. giving SiO$_2$, 1.1 mol=66 g.
Titanium dioxide, TiO$_2$_____ .63 g. giving TiO$_2$, .63 g.
Manganese carbonate, MnCO$_3$, 60% MnO_____ .62 g. giving MnO, .37 g.

These ingredients may be mixed and ball-milled together dry for about 1 hour in a 2 quart ball-mill, and then fired in either of the ways described above (i. e., either in air or in steam) for the phosphor without manganese—1150° C. being a preferred temperature of heating, and one to two hours a suitable heating time. If calcium sulphate is substituted for 10 mol per cent of the calcium carbonate, as hereinbefore mentioned, the formula last above becomes:

| | Grams |
|---|---|
| Calcium carbonate, CaCO$_3$ | 90 |
| Calcium sulphate, CaSO$_4$ | 13.6 |
| Silicic acid, 85% SiO$_2$ | 77.6 |
| Titanium dioxide, TiO$_2$ | .63 |
| Manganese carbonate, MnCO$_3$, 60% MnO | .62 |

The use of steam or the partial substitution of sulphate in the batch enhances the brightness of these double-activated phosphors about as in the case of phosphors activated with titanium alone; and when both these measures are employed together, the enhancement is in many cases similarly cumulative.

There are several possibilities as regards the condition of the activating titanium in the phosphor. It may be present as titanium dioxide, TiO$_2$, in solid solution in normal calcium silicate, CaSiO$_3$; or it may be present as calcium titanate, CaTiO$_3$, forming a double compound with normal calcium silicate; or it may be present as titanium silicate, TiSiO$_3$; or as calcium titanosilicate, CaO·TiO$_2$·SiO$_2$; or in some other form. In the case of a barium silicate phosphor, the corresponding barium titano-silicate is $$BaO \cdot TiO_2 \cdot 3(SiO_2)$$

When manganese is present as a co-operating activator, it may be in the form of MnO or MnSiO$_3$.

As shown in the single figure, the emission from the phosphor specimen represented rises steeply from a low intensity at 3800 A to approximately maximum peak value at a wavelength around 4000 A., holds nearly constant to around 4600 A., declines quite gradually to around 5200 A., and then falls off more rapidly but still gradually to a low level approaching its initial intensity at about 6000 A.

What I claim as new and desire to secure by Letters Patent of the United States is:

1. Fluorescent silicate of group II metal of atomic weight below 200 activated with titanium alone in an amount equivalent to approximately ½ to 1 per cent TiO$_2$ by weight, and emitting ultraviolet when subjected to cathode rays.

2. Fluorescent calcium silicate activated with titanium alone in an amount equivalent to approximately one-half to one percent TiO$_2$ by weight, and emitting ultraviolet when subjected to cathode rays.

3. A method of preparing titanium-activated fluorescent silicate of group II metal of atomic weight below 200 which comprises heating a mixture consisting of silica and compounds of the group II metal which break down to give the oxide of the metal substantially at the temperature of formation of the silicate in proportions sufficient to give the desired silicate upon reaction together with sufficient titanium compound to give approximately ½ to 1 per cent TiO$_2$ in the reaction product, the group II metal compounds being composed of a minor proportion of sulphate and a major portion of compound other than the sulphate.

4. A method of preparing titanium-activated fluorescent silicate of group II metal of atomic weight below 200 which comprises heating in an atmosphere of steam a mixture consisting of silica and compounds of the group II metal which break down to give the oxide of the metal substantially at the temperature of formation of the silicate in proportions sufficient to give the desired silicate upon reaction together with sufficient titanium compound to give approximately ½ to 1 per cent TiO$_2$ in the reaction product, the group II metal compounds being composed of a minor proportion of sulphate and a major portion of compound other than the sulphate.

5. A method of preparing titanium-activated fluorescent silicate of group II metal of atomic weight below 200 which comprises heating in an atmosphere of steam a mixture consisting of silica and a compound of the group II metal which breaks down to give the oxide of the metal substantially at the temperature of formation of the silicate in proportions sufficient to give the desired silicate upon reaction together with sufficient titanium compound to give approximately 0.5 per cent to approximately one per cent TiO$_2$ in the reaction product.

HERMAN C. FROELICH.

REFERENCES CITED

The following references are of record in the file of this patent:

UNITED STATES PATENTS

| Number | Name | Date |
|---|---|---|
| 2,171,145 | Leverenz | Aug. 29, 1939 |
| 1,073,932 | Rupprecht | Sept. 23, 1913 |
| 2,244,558 | Krantz | June 3, 1941 |
| 2,299,510 | Steadman | Oct. 20, 1942 |
| 2,110,162 | Leverenz | Mar. 8, 1939 |
| 2,238,026 | Moore | Apr. 8, 1941 |